J. M. TRINER.
SCALE.
APPLICATION FILED APR. 23, 1917.
1,352,104.
Patented Sept. 7, 1920.
5 SHEETS—SHEET 1.
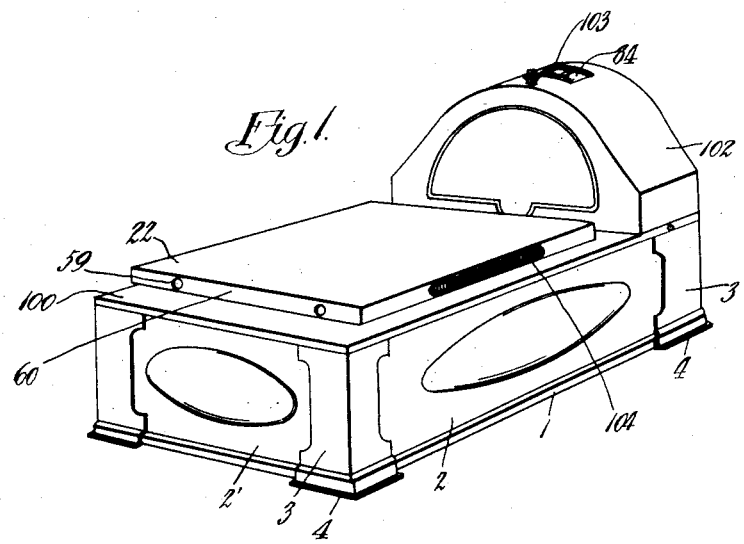
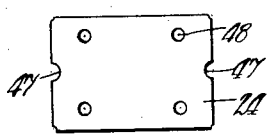 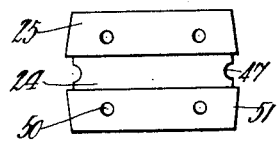 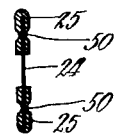
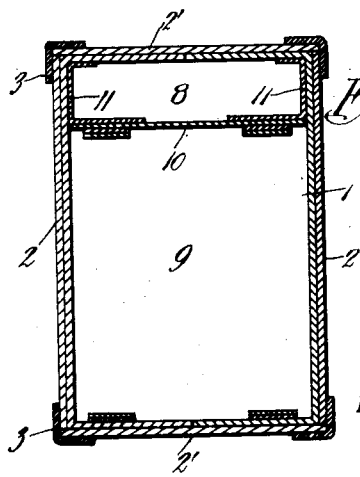
INVENTOR.
James M. Triner
BY
ATTORNEY.

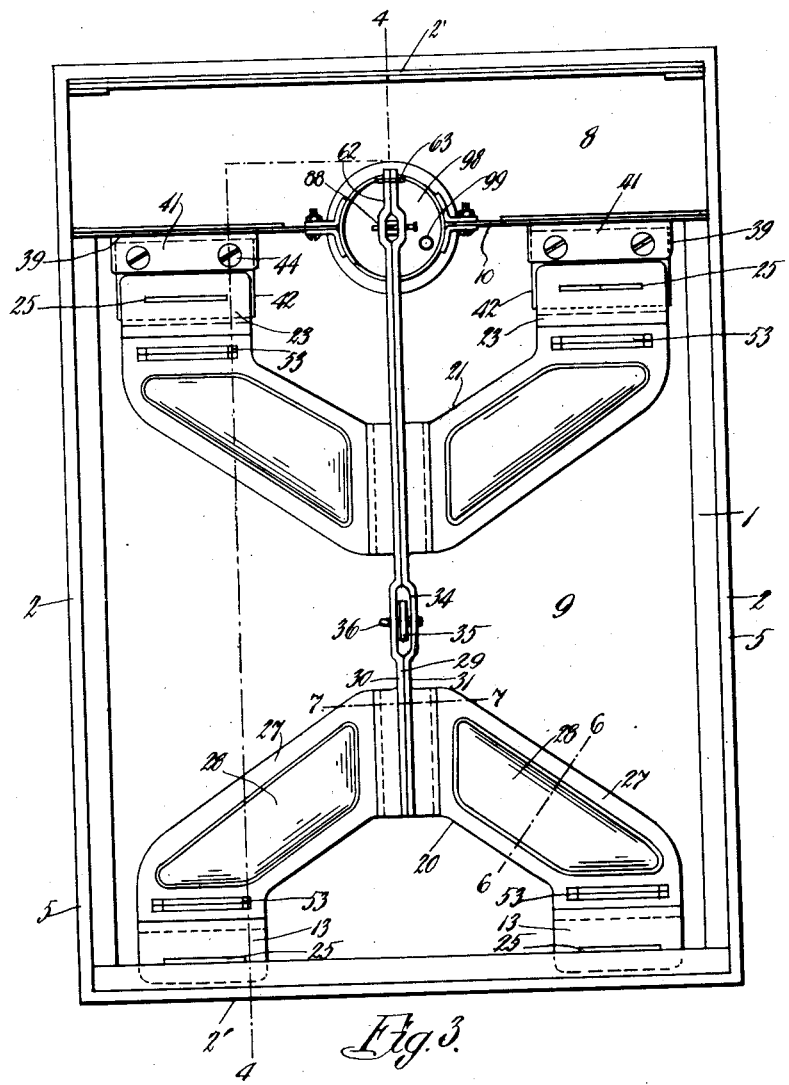

J. M. TRINER.
SCALE.
APPLICATION FILED APR. 23, 1917.
1,352,104.
Patented Sept. 7, 1920.
5 SHEETS—SHEET 3.
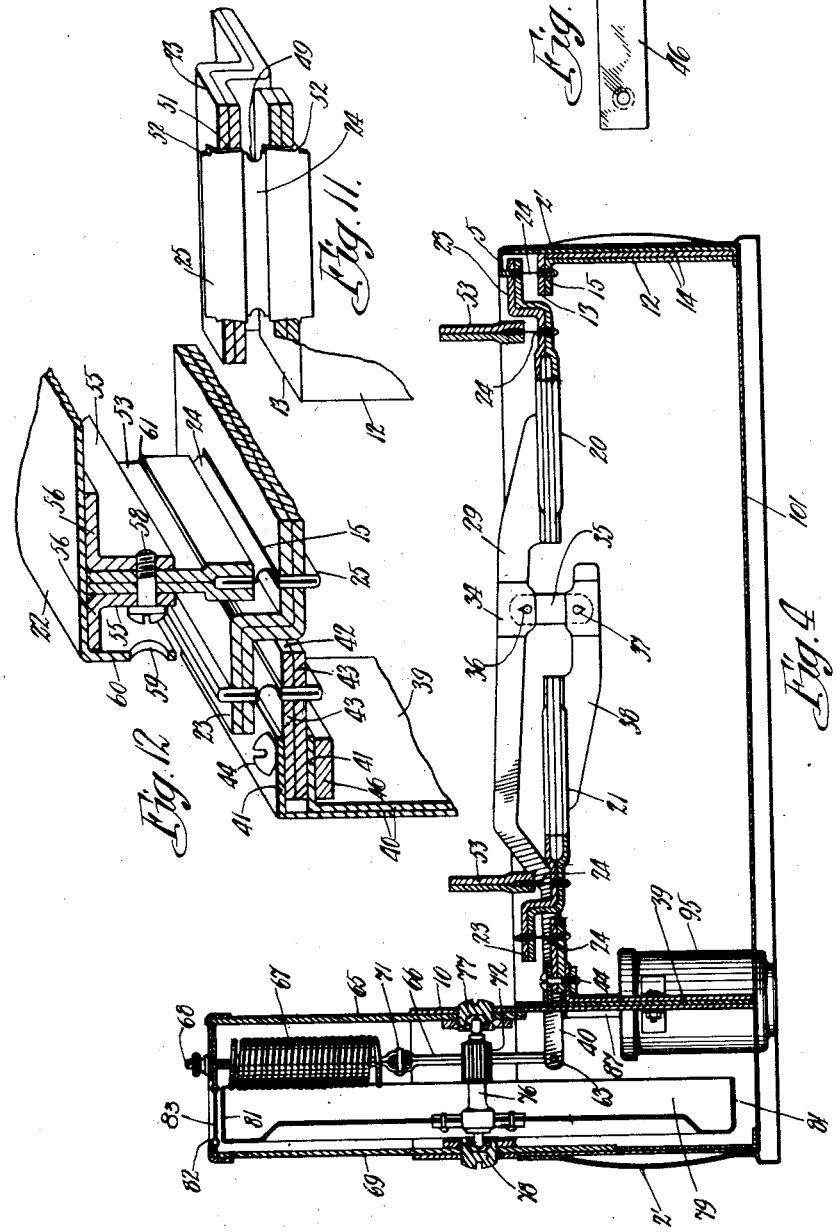
INVENTOR.
James M. Triner
BY Bingly
ATTORNEY J. M. TRINER.
SCALE.
APPLICATION FILED APR. 23, 1917.
1,352,104.
Patented Sept. 7, 1920.
5 SHEETS—SHEET 4.
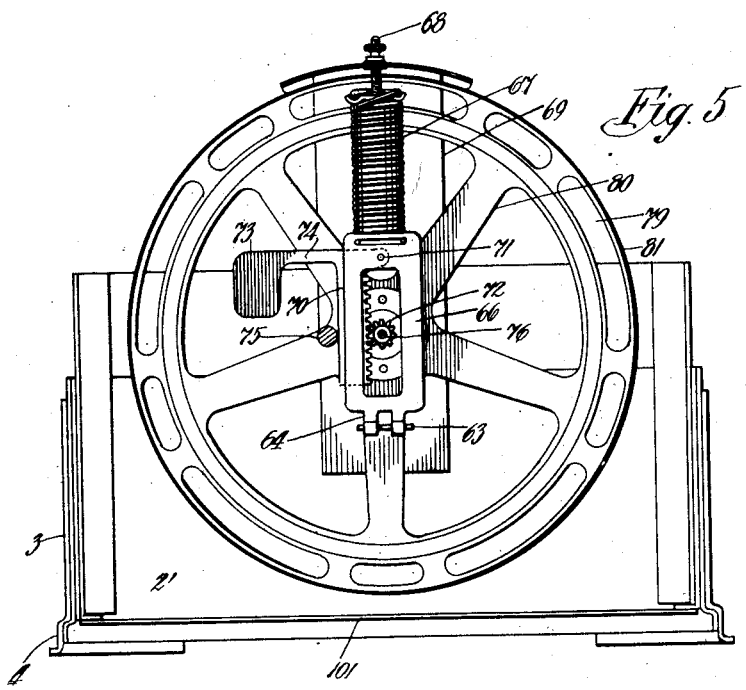
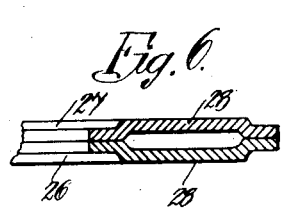
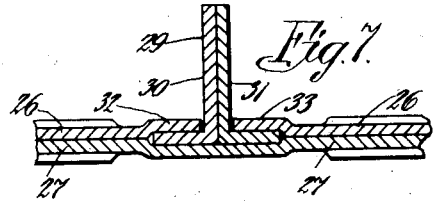
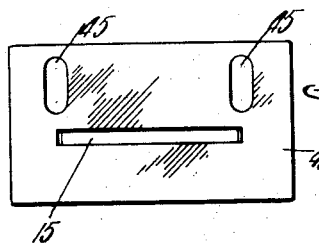
INVENTOR.
James M. Triner
BY
ATTORNEY.

J. M. TRINER.
SCALE.
APPLICATION FILED APR. 23, 1917.
1,352,104.
Patented Sept. 7, 1920.
5 SHEETS—SHEET 5.
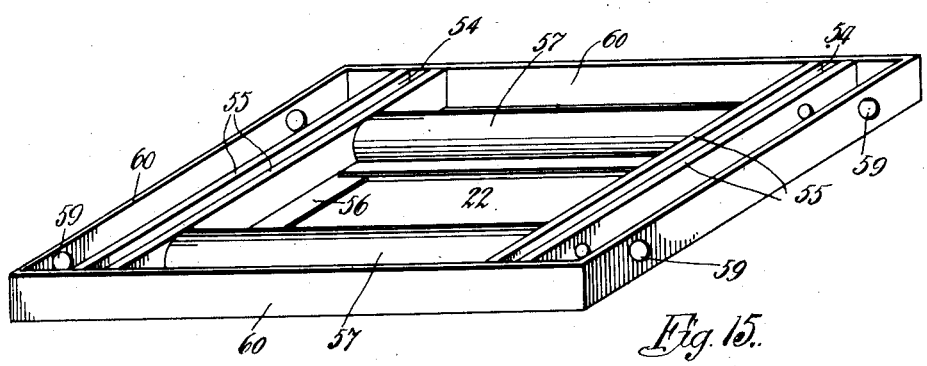
Fig. 15.
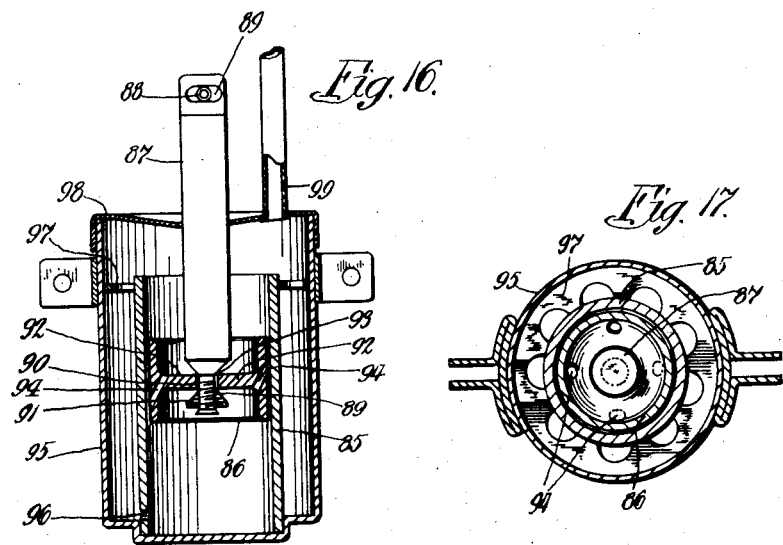
Fig. 16.
Fig. 17.
INVENTOR.
James M. Triner
BY
ATTORNEY

UNITED STATES PATENT OFFICE.

JAMES M. TRINER, OF CHICAGO, ILLINOIS.

SCALE.

1,352,104.

Specification of Letters Patent.  Patented Sept. 7, 1920.

Application filed April 23, 1917. Serial No. 163,935.

*To all whom it may concern:*

Be it known that I, JAMES M. TRINER, 2714 West Twenty-first street, city of Chicago, county of Cook, State of Illinois, have invented certain new and useful Improvements in Scales, of which the following is a specification.

In the construction of scales it has been suggested to dispense with knife edge fulcrums as supports for the scale levers and load beams, and to replace these fulcrums, which naturally had only a relatively short life, by steel plates rigidly fixed in the parts through which the weight had to be transmitted and held in these parts so as to be subject to a strain by compression only. This construction using so-called steel plate fulcrums has up to the present found application to a limited extent in very large railroad scales, where the bending strain exerted by the load upon the plates did not become visible at the indicating part of the scale, but where any undue compression placed upon the steel plate fulcrums resulted in a slight deflection of the scale beam from zero position, which deflection had to be counteracted by shifting the poise or attaching weights to the scale beam. The steel plate fulcrums, therefore, acted only as compression members; and if any deflection of these compression members occurred, the bending axis coincided with the lowermost or uppermost edge of the plate. Just as in the knife edge fulcrum the deflection, if any, or the swinging motion of the fulcrum always took place about the edge as an axis, so in these steel plate fulcrums the bending, if any bending occurred, took place about an edge of the plate.

In contradistinction from these known devices, and in order to provide a substitute of the knife edge fulcrum, which has many disadvantages, for scales of smaller capacity, in the present invention a fulcrum consisting of a steel tape is used; that is, of a compression member which is so extremely thin compared with its height that any compression exerted in direction of its height will show itself in a bending or deflecting action of the tape. If, therefore, the axis—about which the bending occurs—is to take the place of the knife edge of the ordinary knife edge fulcrum, it is necessary that all of these axes should be strictly localized with respect to each other in the different knife edge fulcrum substitutes or steel tape fulcrums. It is not immaterial whether the tape is to bend about its foot edge or top edge, but in all of the tape fulcrums used the bending axes must be located in a common plane. While it is a relatively easy matter to arrange the supporting points of knife edge fulcrums in common plane, it is obvious that more difficulties will be encountered in localizing the bending zones of very thin steel tapes which are secured to the parts of the scale in such manner that the load acts edgewise on the same.

Any looseness of the steel tape fulcrum, either at the point where it is attached to the respective part of the scale or any motion of the fulcrum caused for instance by a movement of the platform in its own plane, naturally would have a tendency to produce a deflection in the tape, or if there should be any deflection, owing to the presence of a load on the platform, the extent of deflection would be altered. In order to secure uniform deflection under uniform loads, or different deflection of the steel tape fulcrum about a well defined axis under different loads, it is therefore necessary not only to secure the steel tape fulcrum to its support in an absolutely rigid way, but also to provide means for preventing displacement of the platform in the platform's own plane; that is, the "shaking" of the platform with respect to the vertical plane of the steel tape must be prevented.

The attachment of the steel tape to the different parts of the scale preferably is effected by a secondary support which firmly engages marginal portions near the top or foot end, or near both of the ends of the tape, from both sides of the same; and instead of providing in the parts on which the steel tape fulcrum is mounted only openings of a size large enough to firmly grip the steel tape, it will then be necessary to provide in these parts openings into which the secondary supports or carriers for the steel tapes may be closely fitted. But it is obvious that even without these secondary supports or binders steel tape fulcrums may be rigidly introduced into the scale levers, scale brackets, or other parts, and may be firmly held therein. The mechanical construction, however, is greatly improved if, instead of these very narrow seats of steel tape in the supporting parts, seats will have to be provided which are adapted to receive and support these binders of the fulcrums.

Owing to the entire novel construction of the steel tape fulcrums, it is desirable that the scale structure, and especially the levers of the scale, also should be modified as compared with the present standard construction of scales. An embodiment including these modifications is shown in the accompanying drawing, which especially illustrates the adaptation of the novel principles to a scale which, owing to the rigid attachment of the fulcrums to the various supports, is readily transportable, and which, for the same reason, does not require that exact horizontal adjustment of the platform which otherwise is absolutely necessary in knife edge fulcrum scales if a correct reading of the indicating means is to be obtained. While in these domestic scales, especially in domestic transportable scales of the character just mentioned, lightness of structure is one of the main conditions, it is also necessary that to facilitate transportation and to facilitate handling and using of the scale by inexperienced persons, all of the parts must be extremely light, the scale must combine at the same time with this reduction in weight considerable strength or rigidity of the parts. Furthermore, in order to become readily transportable, the entire mechanism must be disposed in a compact form in small volume, in a volume which is not only reduced in its height, but also in lateral and endwise extensions.

The improved weighing machine is furthermore characterized by the provision of means which in a novel way dampen or brake the relatively large and continued oscillations of the scale levers, and for this purpose a novel form of dash pot is introduced which permits of slow but uniform and continuous displacement of the braking fluid, immaterial in which direction the scale lever, and therefore also the piston of the dash pot, is moved. This feature is especially valuable in scales on which the load is placed, not slowly, but very abruptly, and it is still more necessary in scales in which the load is taken off the platform very rapidly, as, for instance, in scales intended for the weighing of human beings.

Another object of the invention is to provide a connection between the main scale lever and the weight absorbing mechanism or element, which connection also actuates the indicating device and is continuously maintained in proper engagement with the indicating means by its own weight.

In the embodiment shown, the improved scale is illustrated as a bathroom scale. It is a light, transportable weighing machine adapted to the condition that the center of gravity of the load to be weighed is relatively high, above the support of the weight. The reading point, however, must be readily accessible without requiring the reader to bend over and without necessitating therefore a displacement of the center of gravity of the body in the act of reading. While in many known bathroom scales the reading point of a disk or drum dial is located below the platform, and while in most of the bathroom scales the platform itself is supported on a relatively complicated mechanism at considerable distance from the floor, in the present embodiment this distance is reduced and the platform is rigidly supported against excessive swinging motion in its own plane. This arrangement gives the user that feeling of safety which is necessary for the use of these scales, and which designers of known bathroom scales attempted to attain at the expense of introducing into the mechanism special guiding means, like rollers or balls for the platform. These guiding devices, however, acted on the coöperating tracks, and after short use injured these tracks, producing grooves therein, so that a bending of the body of the user forwardly or rearwardly brought the guiding rollers or balls into more or less forcible engagement with the forward or rearward track, and the readings therefore became very unreliable.

The present scale also is distinguished by the fact that there is no loose connection between levers and fulcrums or between platform and fulcrums, and, therefore, also no loose connection between platform and levers. The scale is for this reason eminently adapted as a scale for domestic uses and may readily be transported from one room to another without possibility of dislocating any parts of the same. Any of the outer parts of the scale may be provided with suitable handles for this purpose. A dislocation of any of the movable parts with respect to other parts by lifting and carrying the scale on the handles is then avoided.

In bathroom scales it is not so much the object of ascertaining the exact weight of the person standing on the scale, but it is material that the change in the weight should be recorded with absolute certainty. Dietetic treatments in order to reduce or increase the weight are usually of long duration, and it is only by repeated comparisons with formerly recorded weights that any actual and valuable change in the weight can be ascertained. If, therefore, a scale records different weights of the same person at the same time, depending upon the bending over of the upper part of the body, and if this difference in the records is increased, owing to the wear of certain parts of the mechanism, the scale will become useless as a bathroom scale. On account of the arrangement of the reading point below the platform—an arrangement which in known bathroom scales is necessary on account of the high position of the platform,—attempts have been made to remedy the described defects by the provision of mirrors. These attempts have only been partly successful. Where, however, the reading point is substantially above the platform, this bending over is not necessary, and it is therefore relatively easy for the user of the scale to maintain the upright position in which the parts are uniformly strained while he is reading the indications on the scale.

Other objects of the new invention will be realized owing to the simple but rigid construction of the scale frame, the readily adjustable arrangement of certain scale levers with respect to the frame and to the connection of the scale lever system with the weight indicating and weight absorbing mechanism.

With these and other objects in view an embodiment of the invention has been described in the following specification wherein, as well as in the claims, the novel features thereof have been pointed out. This embodiment is illustrated in the drawing, wherein—

Figure 1 is a perspective view of the whole scale inclosed in a suitable casing.

Fig. 2 is a diagrammatical sectional view of the scale frame.

Fig. 3 is a top plan view of the scale lever system.

Fig. 4 is a vertical section on line 4—4 of Fig. 3.

Fig. 5 is a front view of the weight indicating and weight absorbing mechanism.

Fig. 6 is a detail sectional view of a lever on a larger scale, on line 6—6 of Fig. 3.

Fig. 7 is a similar sectional view of a scale lever and its extension on line 7—7 of Fig. 3.

Fig. 8 shows a plan view of a fulcrum.

Fig. 9 is a plan view of a fulcrum combined with its carrier.

Fig. 10 is partly section and partly edge view of the fulcrum combined with the carrier.

Fig. 11 is a perspective sectional view showing the connection of a scale lever with a supporting bracket.

Fig. 12 is a perspective view showing the connection of a scale lever with the platform.

Fig. 13 is a top view of a supporting member for the fulcrum.

Fig. 14 is a top view of a common locking member for several fastening elements used for the attachment of the supporting member to the brackets.

Fig. 15 is a perspective view of the platform seen from the under side.

Fig. 16 is a longitudinal sectional view through a dash pot, and

Fig. 17 is a horizontal sectional view of the dash pot.

The rigidity of the structure comprising the scale casing or frame will be apparent from the diagrammatical, sectional view of Fig. 2 which shows the side plates and end plates of the scale reinforced by additional plates on the inner surface thereof, the abutting edges of these reinforcing plates being midway between the corners and adjacent the end walls 2'.

The scale casing comprises a low box 1 made up of steel plates 2, 2' which are rigidly held together, preferably by welding, reinforced at their abutting ends by additional corner pieces 3, which are extended downwardly to from the feet 4 of the scale, and reinforced near the upper edge by an inwardly projecting flange 5. This box may be of a construction similar to that of my United States Patent No. 1203817 or of the casing construction disclosed in my copending application, Serial No. 96209.

The weight absorbing and indicating device is partly inclosed in a separate compartment 8 of this casing, which is divided from the main compartment 9, containing the scale levers and platform supports, by a partition wall 10, which is also secured to the end wall 2' of the box near which the indicating and weight absorbing mechanism is located. The rigidity of this structure is furthermore enhanced by the provision of substantially U-shaped brackets 11 extending from the partition wall 10 to the rear wall 2', that leg of the U-shaped portion which is fastened to the partition wall 10 and which is intended to reinforce said partition wall 4, projects toward the central plane of the scale to a greater extent than the leg which is secured to the rear wall 2'. The partition wall 10 and the extension on the rear wall 2' serve as supports for the ball or other bearings of the indicator mechanism.

The fulcrums for carrying the scale levers are held on fulcrum supports in the form of brackets, secured to the front wall 2' and to the partition wall 10 respectively of the scale. The brackets near the front wall of the scale consist of vertical portions 12 and horizontal portions 13. They may be held in place with respect to the steel frame by welding or in some other suitable way. These fulcrum supports may consist of a single flat bent bar held with the longer leg against the inner surface of the front wall 2', or, as shown, they may be composed of two relatively thin flat bars 14 which are secured to each other by welding or in some other suitable way. In each of the horizontal supporting portions 13 of these bars, which after combination form a single bracket, a suitable slot 15 serving as a seat for the carrier of a fulcrum, is provided, as for instance by punching, and the two portions 13 are arranged so that the two slots are in register.

A complete accurate registration of these two slots so as to provide an exact, close fit for the carrier of the fulcrum may then be attained by inserting a suitable tool, called a "drift," into the alined slots 15 of the supporting portions 13 whereby these slots are brought into their proper relative positions, and are adapted to receive, preferably in a "driving fit," the carrier of the fulcrums described below.

The fulcrums used in the improved scale are provided with identical carriers at both ends and it is therefore necessary that the ends of the scale levers 20, 21 which support the platform 22 should also be provided with suitable slots 15 for receiving these carriers. In the preferred construction of the scale, these levers are also made up, each, of two substantially flat bars, the plane of the major portion of the levers 20, 21 being approximately in coincidence with the plane of the supporting portions 13 of the brackets. The fulcrum holding portions 23 of these levers, connected by the fulcrums 24 to the brackets are offset with respect to the main plane of the levers. These offset portions 23 are also, in each lever 20, 21, provided with suitable slots 15 adapted to receive the carriers 25 of the fulcrum, as the levers also are made up of two bars each, complete registration of the carrier slots in the bars of each lever is attained by the insertion of a "drift," which has an effect similar to that of a reaming tool and which gives the slots the proper location and size.

The main lever 20 in the main portion comprises two substantially flat bars 26, 27 of V-shape, as shown in top plan view, which are held together near their coinciding marginal portions by welding or in some other suitable way. The portions 28 between the two longitudinal margins in the bars are offset away from each other, as shown in Fig. 6, whereby the entire structure is strongly reinforced against bending strains, and the like. The main lever arm 29, which extends from the central portion or point of the V-shaped lever 20 forwardly, also consists preferably of two flat bars 30, 31, each inserted at the rear end between slightly offset portions 32, 33 of the main lever 20; and then bent so as to extend forwardly in a plane perpendicular to the plane of the main lever 20. The two flat bars 30, 31 constituting this main lever arm 29 are offset at 34 so as to be bent away from each other, providing thereby an opening confined by parallel walls and serving for the reception of the link 35 which connects the main lever 20 with the secondary lever 21. This link 35 is suspended from an ordinary knife edge fulcrum 36 driven through the two offset walls of the main lever arm 29 and connects with the secondary lever by means of a similar knife edge fulcrum 37 also passing through two spaced wall portions of an extension 38 which is attached to the secondary lever 21 in a way very similar to that in which the main lever arm 29, holding the nose iron 40, is attached to the lever 20.

The construction of the secondary lever 21 is similar to that of the main lever 20, and the attachment of the fulcrums 24 for supporting the same from the frame of the scale is very similar to that described with respect to the main lever 20. This secondary lever 21, which is also of general V-shape, has its ends offset at 23 with respect to the plane of the lever, and the offset portions are provided with registering slots 15 into which the carriers 25 for the fulcrum may be rigidly inserted. This secondary lever, like the main lever, is preferably also composed of two flat metal bars of relatively weak cross-section, welded together or united in some other suitable way along their coinciding marginal portions but offset between said portions so as to provide a substantial corrugation whereby the entire structure is strongly reinforced.

To facilitate the assembly of the combined scale levers 20, 21 and particularly to provide for adjustment of the secondary lever 21 in the scale frame, the brackets 39 for holding the fulcrums 24 supporting the secondary lever are constructed in a somewhat different way from the brackets at the front. The brackets 39 consist of two relatively thin sheets of metal bent at their upper ends, the vertical portion 40 of these bars being riveted or fastened to each other, and to the partition wall 8, while the horizontal portions 41 are separated from each other a distance large enough to permit of the insertion of lower support 42 into which the fulcrum carrier 25 is inserted. The lower supporting member 42 for the fulcrum consists of two plates 43 of metal welded to each other and each having a slot 15, the two slots being "drifted" into proper registration. The structure, which then comprises the secondary lever 20 with its extension 38 leading to the main lever 20, the fulcrums for supporting the platform 22 by means of platform posts to be described below, and the plates 43 supporting those fulcrums 25 on which the secondary lever 21 itself is mounted, is put in place by inserting the plates 43 into the space between the horizontal portions 41 of the brackets 39, and the proper adjustment is attained as the screw holes through which the fastening members 44 extend are widened to form slots 45 in the bars or plates 43 held between the brackets. By suitably shifting the plates 43 prior to the tightening of the screws 44 an adjustment is rendered possible, which will bring the openings for the knife edges 36, 37 or the platform posts in proper position. These screws 44 are held by bars 46 provided with tapped holes 47, each bar constituting thereby a double nut for said brackets.

While in ordinary scales the platform and levers are supported on knife edges which may be connected with the platform by legs or links permitting lateral shifting of the platform, in the present case the connection of the platform with the levers, and of the levers with their brackets is effected not by knife edge fulcrums, but by steel tape fulcrums.

These fulcrums 24 comprise relatively short sections of very thin freely flexible steel tape, as shown in Figs. 9, 10 and 11. According to Fig. 9 the steel tape section used in the illustrated embodiment of the scale has quadrilateral contour (although this is immaterial), and is inserted into the weighing machine in a position in which certain of these edges are placed horizontally while the others are vertical. The tape is provided, preferably near the horizontal margins, with one or more holes 48.

It has been suggested in particularly sensitive scales, to support the scale beam in its center on a relatively long thin steel band of flexible watch spring steel, which in the swinging motion of the scale beam was subjected to a torsional strain. The ends of this steel ribbon used in torsion scales were either secured to a truss or the entire ribbon was formed into an endless ribbon stretched over a frame work.

It has also been suggested, as stated above, to use fulcrums made of nonflexible steel-plate in heavy beam scales. In these instances the plate portions of the fulcrums were subjected to a slight flexure only, as the weighing beam vibrated and the lever system responded to the condition of balance. In contradistinction therefrom it may be noted that in the present scale the tape fulcrums are guarded against torsional stresses, and they are subjected to bending strains proportional to the load on the platform.

These thin, short, steel tape sections are therefore inserted in their supports or into the parts supported by them edgewise, so that upon placing a load on the scale, a compression is exerted on these fulcrums in vertical direction. This compression strain, in a direction at right angle to the plane of the levers or brackets, will produce in these fulcrums a deflection on those portions which are not rigidly held within the scale parts, namely, in the free length of the fulcrum confined by the marginal portions which are inserted into the supported or into the supporting parts.

This deflection might occur near the upper or near the lower edge of the free length of steel tape left between the marginal confined portions. For the purpose of accurate weighing, however, it is necessary to provide means for causing the bending or deflection of these fulcrums at points or zones uniformly located in the several fulcrums with respect to the supports of the same and in order to attain this object of causing the bending in uniformly located zones, the free lengths of flexible steel tape sections are provided at predetermined distances from the confining portions with a reduced cross section. This reduction of the cross section of the fulcrum is in the present instance produced by cutting portions out of the fulcrum and preferably by cutting portions out of the fulcrum from one or more vertical edges inwardly. For this purpose a notch 47 is provided in the vertical edge of the fulcrum and the depth of this notch measured at points located at different distances from the ends of the notch, is different. In the embodiment shown the depth of the notch increases from one end toward the middle, where it is a maximum and it decreases from this maximum again to the other end point of the notch.

While one notch 47, shown in the present instance of semicircular outline may be sufficient to attain a bending of the flexible steel tape fulcrum on a transverse line which would terminate at the point of the greatest depth of the notch, it has been found advisable to provide the fulcrum with notches, preferably of equal size and contour, at oppositely located points of the vertical edges. These notches 47 which are intermediate the confining portions of the steel tape fulcrum are preferably arranged so that the bending occurs exactly midway between the said confining portions of the same, and this arrangement is observed with respect to all of the fulcrums of the scale.

By this means the width of the fulcrum is reduced and a compression strain exerted edgewise on the fulcrum in a direction parallel to the vertical edges of the same may cause a bending of the flexible steel tape about a central connecting line of the notches as an axis. It should be noted, however, that the free length of the fulcrum measured from one confining portion near one horizontal edge to the other is considerably smaller than the width of the fulcrum even where this width is reduced by the incision of the notches shown. Owing to this reduction of the free length of the fulcrum the occurrence of torsional strains which would have a tendency to twist one end of the steel tape section with respect to the other end thereof, is eliminated.

The carriers 25 for the steel tape fulcrums 24 also are preferably made of sheet steel and consist of binders or cradles made of a blank which is folded on its longitudinal axis against itself so that the two folded portions engage two opposite surfaces, front and rear, on a marginal transverse portion and hold said fulcrum rigidly between them if these two carrier portions are securely pressed against each other and against the transverse edge of the steel tape inserted therebetween, Figs. 10, 11. The clamping effect of this carrier on the steel tape is improved by the provision of the holes 48, in the steel tape near its marginal portions and by pricking the material of the binder 24 into these openings, as shown at 50, after said material has been forced by great pressure against the surfaces of the tape.

This deformation of the carrier leads to the provision of coöperating portions, namely indentations 50 and portions having the holes 48, in the binder and fulcrum respectively, whereby lateral and longitudinal displacement of one with respect to the other is prevented. The deformed portion of the binder projects directly into the plane of the fulcrum.

Identical binders may be provided to engage the top and bottom portions of each steel tape fulcrum. The lateral edges of these binders, as shown at 51, are not parallel but slightly converging so as to facilitate the driving of the binder or cradle into the slot which has been previously made in the bracket or scale lever respectively, and so as to limit this driving motion to a certain point.

As the slot 15 has been drifted to exact dimensions, and as the binder also has been machined to exact dimensions, it is obvious that in this manner the steel tape fulcrum carrier 25 may be driven to an exactly predetermined point into the supporting bracket or lever, and after having been secured in this predetermined desirable position, means are provided for preventing an accidental displacement of the carrier and steel tape fulcrum with respect to its supporting part. For this purpose the projecting part of the carrier is indented, as shown at 52, this indentation being caused, for instance, by a chisel, so that the bur immediately below the holding portion of the binder 25 forming a roughened part of the edge renders a withdrawal of the binder impossible. Without this bur or some other holding means the carrier and fulcrum might easily be removed, owing to the tapering construction of the carrier. It may therefore be stated that the binder 25 is constructed with a portion 51 facilitating the driving of the same into its seat, and with portions 52 which prevent accidental withdrawal or displacement of the binder after the same has been placed in its proper position.

While in ordinary scales the platform itself is supported on knife edges connected by movable links with scale levers, in the present case the platform 22 is supported on the scale levers 20, 21, not by knife edge fulcrums, but by steel tape fulcrums 24; and owing to the sensitiveness of these fulcrums when proper alinement is maintained, the connection between the platform 22 and the levers 20, 21 is made so as to practically prevent lateral or longitudinal movement of the platform 22 in a horizontal plane after it has once been placed in operative position. For this purpose the flexible steel tape fulcrums 24, which are intended to hold the platform and which are rigidly secured in the scale levers 20, 21, carry at their upper ends supports or binders 25, which are rigidly inserted into platform posts 53, whereby these platform posts are flexibly connected with the scale levers but do not form any part of the platform proper. The platform 22 engages the four posts 53, which project upwardly from the scale levers 20, 21 by means of guides 54, which are attached to the lower face of the platform 22, and which act at the same time as means for materially strengthening and stiffening the platform. These guides 54 are composed of vertical flanges 55 of angle bars, while their other flanges 56 are welded or secured in some other way to the under face of the platform 22. The two companion bars are arranged so as to leave between them a space just of sufficient width to receive the upper end of the machined portion of the posts 53.

In this way a displacement of the platform 22 relatively to the posts, longitudinally in a horizontal plane, would be rendered impossible, owing to the engagement of opposing flanges 55 on the platform with opposite sides of the posts 53. The platform 22 furthermore has reinforcing corrugations 57 on its under surface, which corrugations, however, extend at right angles to the reinforcing guides 54, and the longitudinal corrugating members 57 are at their ends in engagement with the oppositely located reinforcing elements 55.

A lateral displacement of the platform 22 with respect to the posts 53 projecting upwardly from the scale levers is prevented by the introduction of holding screws 58, which pass through the depending flanges 55 of the guides 54, through screw holes in the upstanding posts 53, and into the other depending flange 55 of the angle bars, which last named flange is preferably provided with tapped holes into which the screws 58 engage. The heads of these screws 58 are rendered accessible to manipulation by means of a screw driver through holes 59 in the circumferential flange 60 of the platform.

It will also be seen that the platform posts 53 are each composed of two plates, which are rigidly secured to each other on almost their entire surface. The rigid attachment of the steel tape fulcrum 24 to these platform supports, which may be said to be located in the plane of the fulcrum, is attained by widening at the lower end the interspace between said plates, so as to render the insertion of said fulcrum 24 with its binder possible. This widening is effected by offsetting those ends of the post plates which are directed toward the fulcrum and clamping the offset portions, as shown at 61, firmly to the carrier 25.

While in the scale levers 20, 21 and brackets supporting the fulcrums 24 the fulcrum carrier 25 projects beyond its seat and is held by burs or the like against withdrawal, the platform posts, owing to the offset clamping portions 61, receive the entire carrier 25, so that the carrier extends only partly through the material of the post.

The main lever is extended at its front end by a nose iron 40, preferably adjustably secured thereto, and the front end of the nose iron is provided with a transverse opening adapted to receive a holding pin 63, which also passes through the lower ends of a stirrup member 64 connected with the weight absorbing mechanism and straddling the front end of the nose iron. This stirrup member is also connected with parts intermediate the attachment to the nose iron and the attachment to the weight absorbing mechanism for actuating the indicator device, which is mounted in suitable bearings located in extensions on the rear wall 2′ of the scale and in extensions of the partition wall 10 of the scale.

A bracket 65 extending upwardly from the partition wall 10 near the center thereof is bent at a right angle near its top, and serves for the attachment of the weight absorbing mechanism or device, which in this instance is constructed as a spring 67 secured at its top to the bracket 65, the lower end of the spring being attached to a yoke 66 having a stirrup 64, which straddles and is movably connected with the free end of the nose iron on the main lever extension 29. The top plate of the bracket also serves for supporting the adjusting screw 68 for the spring, whereby the indicator, in a well known way, may always be set to zero position if the position of the scale or the variation of temperature might have influenced the absorbing mechanism. The plate is furthermore supported by a central flat bar 69 extending upwardly from the rear wall of the scale casing, so that the top plate connecting the two central flat bars 69 and 65 is firmly held in position.

The quadrilateral yoke 66, movably connected to the free end of the nose iron 40, preferably is also made of a double thickness of relatively thin sheet metal, and these two layers of sheet metal of which the yoke is composed are separated from each other in one of the sides of the yoke so as to receive between them a rack bar, which is swingingly supported on a pin 71 located in the longitudinal axis of the yoke. The rack bar 70 is held permanently in uniform engagement with the indicator pinion 72, owing to the provision of a counterweight 73 on an arm 74 projecting from the rack in a direction away from the pivot 71. In order to assure a movement of the yoke in a rectilinear path and to hold thereby the rack 70 in mesh with pinion 72, a stop or guiding pin 75 is rigidly secured to the bracket 65 at such distance from the axis of the indicator shaft that the outer edge of the guiding pin is permanently in frictional engagement with the outer edge of the yoke or rack bar, and this guiding pin 75 preferably is located in a horizontal plane with the axis of the indicator shaft 76, whereby the proper mesh between the rack and the pinion is uniformly and permanently maintained. This is of great advantage in household scales and the like, where it is not always possible to place the scale in exactly horizontal position, and where an adjustment of the platform or other parts of the mechanism to true horizontal position cannot be left to the user of the scale who is not experienced in matters of this kind.

The indicator spindle or shaft 76 may be supported in ball bearings 77, 78 of a construction similar to that shown in my copending application, Serial No. 96209. Any other suitable bearing may be used, the main requirement being that the bearings should be as frictionless as possible to allow of a free rotary movement of the indicator dial 79. This indicator dial is constructed in the present case as a wheel or disk secured by spokes 80 at its center to the indicator shaft 76. In order to properly place the graduation marks on the indicator dial so that they can be read by a person standing on the platform 22, the disk has a flange 81 bent at right angles to the plane of the spokes, whereby these graduation marks may be applied to the dial like ordinary drum dials. The highest point of this flat drum 81 bearing the graduation marks is located immediately below the top plate, which connects the extension 65 secured to the partition wall 10 and to the end wall extension 69 of the scale casing. The top plate may be provided with an opening 82, and the center line of the opening, which line forms the reading point, may be marked either by a thread or wire 83 stretched across the opening, or the glass 84 (or other transparent material) covering the opening 82 may be provided with a marking line.

It will be seen that the reading point of this scale is above the platform, but that the center of the drum dial is either below or in one plane with the platform, which not only renders the entire scale very compact, but which also facilitates the reading of the scale by a person standing on the platform.

The scale also comprises a novel means for dampening the oscillations which will be set up in the weight absorbing mechanism if a load is suddenly placed on the platform or is suddenly removed therefrom. It is immaterial whether the weight absorbing mechanism is constructed as a pendulum device or as a spring, or in some other way, the placing of a load on the platform or the removal of the load from the same will cause oscillations which would retard the period at which the indicating device is set at rest in the new position in which the scale is at equilibrium. While these oscillations could eventually be avoided if the load would be placed on the platform very slowly and carefully, or if the load would be removed from the platform in the same way, it is to be noted that in household scales or in ordinary commercial scales this removal or placing of the load is effected suddenly, and this sudden release of the strain on the weight absorbing mechanism or the sudden exertion of the strain thereon will cause heavy oscillations which are only absorbed gradually.

A sudden absorption of these oscillations can be effected by combining with the scale a dash pot 85, in which a piston 86 is movable; this piston, however, being so loosely guided with respect to the cylindrical walls of the dash pot that a film of the fluid held within the pot will always be present between the inner surface of the pot and the outer surface of the piston. The piston rod 87 is at its upper end pivotally connected with the nose iron; and as the nose iron performs a swinging motion while the piston movement should be strictly rectilinear, the pin 88, which connects the piston rod 87 with the nose iron 62, extends through an elongated slot 89 at the upper end of the piston rod. The lower end of the piston rod is reduced by a conical extension which terminates in a cylindrical neck 90. The outer end of this neck is provided with screw threads adapted to receive thereon a holding nut 91 having also a conical surface, whereby a slight swinging motion of the piston rod with respect to the piston is rendered possible; this is necessary to avoid the binding of the piston against the inner walls of the cylindrical surface, which might occur in view of the fact that the piston is not directly guided within the cylinder.

The piston 86 of the dash pot comprises a relatively long cylindrical member having a transverse web or wall 92 between the upper and lower ends, and this wall is provided with an aperture 92 through which the reduced neck 90 of the piston projects. In the fillet at which the transverse web of the piston is joined to the cylindrical wall of the same, channels or bores 94 extend from opposite sides of the web to the outer cylindrical surface of the piston in a slanting direction.

The entire dash pot in which the piston is movable is surrounded by an outer shell or barrel 95, which is closed at its top and at its bottom, while the cylinder in which the piston 86 is movable may be open at its top. The inner cylinder is therefore in communication with the outer shell at its upper end, and a communication between the cylinder and shell is also established through one or more passages 96 near the lower end of the inner cylinder.

In the downward movement of the piston within the cylinder, a movement which takes place when a load is laid on the platform, the piston will force the contents of the inner cylinder through the bore or passages 96 near the lower end of the cylindrical inner shell into the annular space between the cylinder and outer shell or barrel 95, and the fluid from the outer shell will gradually return into the inner cylinder through the open upper end thereof. This fluid will then gradually pass again, when the load is removed, into the space below the piston through the slanting bores 94 leading from the upper surface of the transverse web to the cylindrical surface, assuring that at the same time in the motion of the piston a film of the shock absorbing fluid is continuously maintained between the piston and its cylinder. Upon release of the load and return of the weight absorbing mechanism to no load position, the piston also will be moved upwardly, and the slow circulation of the weight absorbing fluid within the dash pot takes place in opposite directions.

The outer shell 95 may be spaced from the inner cylinder 85 by a perforated annular plate 97 and may be closed on top by a cover 98 from which a tubing 99 extends upwardly through an opening provided for this purpose in the cover 100 of the scale casing, and this tubing may serve for venting the interior of the dash pot, and it may also be used for replacing any of the fluid that may have evaporated or disappeared in some other way.

The bottom of the casing 1 is formed by a plate 101, through a hole of which the lower end of the dash pot projects. Protection against the entrance of dust or other foreign bodies into the lever system is therefore afforded by the plates 100 and 101, which together with the side and end walls 2, 2' form a complete closure. A hood 102 is placed over the indicator device and weight absorbing mechanism, having an opening at 103 over the reading point. Handles 104 are shown in Fig. 1 on the platform 22 (not shown in Fig. 15), although these handles may be secured to any other part of the scale.

I claim:

1. In a scale, the combination of scale levers, supports for the same, and flexible steel tape fulcrums inserted edgewise between said supports and levers, said flexible steel tape fulcrums being provided with portions causing the bending of each of said fulcrums along a predetermined line if a motion of said scale levers relative to said supports occurs.

2. In a scale, the combination of scale levers, supports for the same, flexible steel tape fulcrums inserted edgewise between said supports and said scale levers, said fulcrums being provided with portions of a cross-section reduced with respect to the remainder of the flexible portion of the fulcrum.

3. In a scale, the combination of scale levers, supports for the same, flexible steel tape fulcrums inserted edgewise between said supports and said scale levers, said fulcrums being provided with portions of reduced cross-section at predetermined fixed distance from said scale lever.

4. In a scale, the combination of a scale lever, a support for the same, and a flexible steel tape fulcrum inserted edgewise between said support and scale lever so as to be located in a plane vertically with respect to said support and said lever, a vertical edge of said steel tape fulcrum being provided with a notch adapted to reduce the cross-sectional area of said fulcrum in a certain portion thereof.

5. In a scale, the combination of scale levers, supports for the same, flexible steel tape fulcrums inserted edgewise between horizontal portions of said supports and horizontal portions of said scale levers, said steel tape fulcrums being in vertical planes with respect to said horizontal portions and said fulcrums being provided on their vertical marginal portions with a notch of a depth different at different portions of the length of the notch whereby at the deepest portion of the notch a maximum reduction of the cross-sectional area of the steel tape fulcrum is produced.

6. In a scale, a flexible steel tape fulcrum, supported at opposite ends in parts of the scale, having a portion reduced in width intermediate the supports.

7. In a scale, a flexible fulcrum having a notch on a longitudinal edge of the fulcrum midway between transverse lines of the fulcrum, which lines define the free length of the same.

8. In a scale, a flexible fulcrum having a semi-circular notch on a longitudinal edge of the same midway between transverse lines of the fulcrum, which lines by their distance from each other define the free length of the fulcrum.

9. A steel scale fulcrum adapted for edgewise insertion between scale parts so as to leave a free length of the fulcrum between parallel marginal holding portions thereof, said fulcrum being provided with a cut out portion intermediate said marginal holding portions.

10. A steel scale fulcrum adapted for edgewise insertion between scale parts so as to leave a free length of the fulcrum between parallel marginal holding portions thereof, said fulcrum being provided with a cut out portion midway between said marginal holding portions.

11. A steel tape scale fulcrum adapted for edgewise insertion between scale parts so as to leave a free length of the fulcrum between parallel marginal holding portions thereof, said fulcrum being provided with notches midway between said marginal holding portions.

12. A steel tape scale fulcrum adapted for edgewise insertion between scale parts so as to leave a free length of the fulcrum between parallel marginal holding portions thereof, said fulcrum being provided with notches intermediate said marginal holding portions.

13. A steel scale fulcrum adapted for edgewise insertion between scale parts so as to leave a free length of the fulcrum between confining horizontal marginal portions of the same, said fulcrum being provided with oppositely located notches on the free edges thereof intermediate the confining marginal portions of the fulcrum.

14. A steel scale fulcrum adapted for edgewise insertion between scale parts so as to leave a free length of the fulcrum between confining marginal portions of the same, said fulcrum being provided with oppositely located notches on the free edges thereof midway between the confining marginal portions of the fulcrum.

15. A steel scale fulcrum adapted for edgewise insertion between parts of a scale and adapted to be confined on marginal portions thereof so as to leave a free length of the fulcrum vertically between said confining marginal portions, the free edges of the fulcrum being provided with oppositely located notches of equal size intermediate said confining marginal portions.

16. A steel scale fulcrum adapted for edgewise insertion between parts of a scale and adapted to be confined on marginal portions thereof so as to leave a free length of the fulcrum vertically between said confining marginal portions, the free edges of the fulcrum being provided with oppositely located notches of equal size midway between said confining marginal portions.

17. A fulcrum for scales, consisting of a steel tape section having a transverse edge and being provided with a hole adjacent said edge, and a carrier engaging a portion of said steel tape section adjacent said edge, a portion of said carrier being forced into said hole.

18. A steel tape fulcrum for scales, consisting of a steel tape section and a sheet metal carrier for the same, a portion of said carrier being forced into the plane of said steel tape section.

19. A scale fulcrum, consisting of a steel tape section and a carrier for the same, said carrier having a portion deformed with respect to the remainder of the carrier and said deformed portion projecting into the plane of the steel tape section.

20. In a scale, the combination with a fulcrum supporting part, of a fulcrum carrier, a flexible fulcrum to which said carrier is attached, a seat in said fulcrum supporting part for said carrier, and means on said carrier for preventing withdrawal of the same from its seat.

21. In a scale, the combination of a fulcrum supporting part, a fulcrum carrier having tapering edges, a flexible fulcrum carried thereby, the fulcrum supporting part being provided with a seat adapted to receive the fulcrum carrier, and means on the edges of said fulcrum carrier for preventing withdrawal of the same from the supporting part.

22. In a scale, a fulcrum supporting part, a flexible fulcrum, a fulcrum carrier engaging the fulcrum, said fulcrum carrier being provided with non-parallel edges, the fulcrum supporting part being provided with a seat adapted for engagement with said non-parallel edges, and means on the edges of the carrier for preventing withdrawal of the same from the supporting part.

23. In a scale, the combination of a fulcrum supporting part, a flexible fulcrum, a carrier rigidly secured to said fulcrum, said carrier being provided with edges converging in a direction away from said fulcrum, the fulcrum supporting part being provided with a seat adapted to receive said converging edges, and means on said edges for preventing withdrawal of the same from the converging seat of the fulcrum supporting part.

24. In a scale, the combination of a fulcrum supporting part, a flexible fulcrum, a carrier engaging said fulcrum firmly, the fulcrum supporting part having a seat for said carrier, the portion of said carrier projecting from said seat being provided with means for preventing the withdrawal of the carrier from the same.

25. In a scale, the combination of a fulcrum supporting part, a flexible fulcrum, a tapering fulcrum carrier, the fulcrum supporting part being provided with a slot permitting the insertion of a tapering carrier, a portion of the carrier projecting from the slot, the carrier having a lateral extension on the portion projecting therefrom adapted to prevent the withdrawal of the carrier from the seat.

26. In a scale, the combination of a scale lever, a flexible fulcrum, a carrier for said fulcrum inserted in the scale lever through a seat in said lever, the carrier portion projecting from the seat being provided with a bur adapted to prevent withdrawal of the carrier from the seat.

27. In a scale, the combination of a scale lever, a flexible fulcrum, a carrier for said fulcrum inserted in a seat of said scale lever, the edges of said carrier being partly smooth and partly roughened to prevent withdrawal of the carrier from the seat.

28. In a scale, the combination of flexible steel tape fulcrums, fulcrum carriers, scale levers, and supports for said carriers, said levers and supports being each composed of a pair of plates in rigid superposition and the plates being provided in each support and lever with slots in registration, adapted to serve as seats for the fulcrum carriers inserted in said slots.

29. In a scale, the combination of fulcrums and scale levers, the scale levers consisting of substantially flat bars arranged in pairs, the bars of each pair being rigidly united along coinciding marginal portions and having oppositely directed offset portions between said marginal portions, the fulcrums being rigidly seated in the united marginal portions of said bars.

30. In a scale, the combination of fulcrums, scale levers rigidly supporting said fulcrums, each scale lever consisting of a pair of V-shaped flat bars rigidly united along coinciding marginal portions and having offset portions, extensions secured to said scale levers near the apex of the V, said extensions being inserted between the bars of which the scale levers are composed, and movable links inserted between said extensions.

31. In a scale, the combination of flexible steel tape fulcrums, fulcrum supporting brackets, scale levers, and supporting plates adjustably secured in said brackets, the fulcrums being rigidly inserted at opposite ends in said supporting plates and scale levers respectively.

32. In a scale, the combination of flexible steel tape fulcrums, scale levers, fulcrum supporting brackets, and supporting elements adjustably and removably secured in said brackets, the flexible steel tape fulcrums being inserted at opposite ends in said scale levers and said supporting plates respectively, the fulcrum portions between said plates and levers being of greater flexibility than the portions secured to said levers and plates respectively.

33. In a scale, the combination of flexible steel tape fulcrums, scale levers, brackets mounted in opposition to the ends of said scale levers, said brackets having spaced horizontal portions, and a supporting plate adjustably secured between said spaced horizontal portions, the flexible fulcrums being rigidly held in said scale levers and said supporting plates respectively.

34. In a scale, the combination of flexible steel tape fulcrums, scale levers, and brackets, each bracket comprising two angular plates with their vertical faces contiguous, while the horizontal faces of said plates are spaced from each other, and supporting members adjustably held between said horizontal portions, the ends of said flexible steel tape fulcrums being rigidly inserted in said horizontal supporting members and scale levers respectively.

35. In a scale, the combination of flexible steel tape fulcrums, scale levers, and brackets mounted in opposition to the ends of said scale levers, each of said brackets comprising spaced horizontal portions and supporting members adjustably inserted between said spaced horizontal portions and having longitudinal slots, and fastening elements removably extending through said horizontal portions of the brackets and through the slots of the supporting members for securing them to the brackets, the flexible steel tape fulcrums being rigidly held by said scale levers and supporting members.

36. In a scale, the combination of flexible fulcrums, scale levers, a scale frame, and brackets rigidly mounted to said scale frame, the flexible fulcrums being rigidly secured between said brackets and said scale levers, each of the brackets including a fulcrum supporting member adjustably mounted thereon, a plurality of fastening means extending through each of said brackets and supporting members, and a common locking element for all of said fastening means.

37. In a scale, the combination of a flexible steel tape fulcrum united to fulcrum carriers, a scale lever, a platform, one of the carriers extending through the entire thickness of the scale lever, and a platform post firmly attached to the platform, said platform post being provided with a seat for the other fulcrum carrier, said other carrier extending only partly through the material of said post.

38. In a scale, the combination of a flexible steel tape fulcrum, a scale lever to which said fulcrum is rigidly secured, a platform, and a platform post firmly attachable to said platform, said post being composed of two plates between which the steel tape fulcrum is inserted.

39. In a scale, the combination of a flexible steel tape fulcrum, a scale lever to which one end of said fulcrum is rigidly secured, a scale platform, and a platform post firmly attachable to said platform, said platform post consisting of two juxtaposed bars firmly pressed against each other on substantially their entire surface, the two bars being spaced from each other near the margin thereof and the fulcrum being inserted into said marginal interspaces.

40. In a scale, the combination of a flexible steel tape fulcrum, a scale lever, a platform, a platform support, and means for locking said platform rigidly to said platform support, said flexible steel tape fulcrum being firmly secured to said scale lever and said platform support.

41. In a scale, the combination of a flexible steel tape fulcrum, a scale lever, a platform, a platform post firmly connected with said flexible steel tape fulcrum, and means on the platform for guiding the same on the platform post transversely with respect to the longitudinal axis of the scale.

42. In a scale, the combination of a flexible steel tape fulcrum, a scale lever, a platform, a platform support firmly secured to one end of said flexible steel tape fulcrum, and channel members provided on the lower face of the platform engaging opposite sides of the upper portion of said platform post and adapted to guide said platform on said post.

43. In a scale, the combination of a flexible steel tape fulcrum, a scale lever, a platform, a platform post connected with said fulcrum, a pair of channel members located on said platform and adapted to embrace the upper portion of said platform post, and means projecting through said channel members and platform post for locking these parts together.

In testimony whereof I affix my signature.

JAMES M. TRINER.